United States Patent
Bernstein

(10) Patent No.: US 7,586,719 B2
(45) Date of Patent: Sep. 8, 2009

(54) GFCI FAILURE INDICATOR

(75) Inventor: Richard Bernstein, Hicksville, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 116 days.

(21) Appl. No.: 11/343,164

(22) Filed: Jan. 30, 2006

(65) Prior Publication Data

US 2006/0209476 A1    Sep. 21, 2006

Related U.S. Application Data

(60) Provisional application No. 60/648,861, filed on Jan. 28, 2005.

(51) Int. Cl.
*H02H 3/00* (2006.01)
*H02H 9/08* (2006.01)

(52) U.S. Cl. .............................. 361/42; 361/45; 361/46

(58) Field of Classification Search ................... 361/42, 361/45, 46
See application file for complete search history.

(56) References Cited

U.S. PATENT DOCUMENTS

| | | | | |
|---|---|---|---|---|
| 4,024,436 A | * | 5/1977 | Adams | 361/45 |
| 4,250,501 A | * | 2/1981 | Pokrandt | 340/664 |
| 4,344,100 A | * | 8/1982 | Davidson et al. | 361/45 |
| 4,618,907 A | * | 10/1986 | Leopold | 361/45 |
| 4,707,759 A | * | 11/1987 | Bodkin | 361/48 |
| 5,418,678 A | * | 5/1995 | McDonald | 361/46 |
| 5,844,759 A | * | 12/1998 | Hirsh et al. | 361/42 |
| 6,470,803 B1 | * | 10/2002 | Liu et al. | 102/206 |
| 6,744,254 B2 | * | 6/2004 | Clarey et al. | 324/424 |
| 7,042,687 B2 | * | 5/2006 | Radosavljevic et al. | 361/42 |

FOREIGN PATENT DOCUMENTS

GB    2 251 741    * 7/1991

OTHER PUBLICATIONS

LM1851 Ground Fault Interrupter, 1992, National Semiconductor, pp. 1-7.*

* cited by examiner

*Primary Examiner*—Stephen W Jackson
*Assistant Examiner*—Zeev Kitov
(74) *Attorney, Agent, or Firm*—Carter, DeLuca, Farrell & Schmidt, LLP

(57) ABSTRACT

A GFCI having a fault indicator device or signaling device that provides a continuous audible/visual indication of a failure condition of the GFCI is disclosed herein. A failure condition may occur when continuous current flows through the terminals of a trip coil caused by a failed or damaged component such as a TRIAC or SCR of a GFCI. The failure indicator is coupled across the trip coil in the trip mechanism thereby allowing the indicator to detect the current flow. By placing such a visual and/or audible signaling device across the trip coil terminals, the shorted TRIAC or SCR provides continuous power to the coil terminals and the signaling device, even after the coil has burned out, thereby reminding a user to replace the GFCI receptacle. The signaling device can be implemented as an LED, neon lamp, buzzer or other device. The signaling device also can be activated momentarily in normal operating situations whenever the trip coil of the GFCI detects a ground fault condition or when a reset button is pressed.

21 Claims, 1 Drawing Sheet

GFCI FAILURE INDICATOR

Under 35 U.S.C. 119(e), this application claims the benefit of the filing date of a provisional application having Ser. No. 60/648,861 which was filed on Jan. 28, 2005.

FIELD OF THE INVENTION

The present invention relates to circuit interrupters.

BACKGROUND OF THE INVENTION

Ground fault circuit interrupter (GFCIs) are circuits that are designed to interrupt power to various loads, such as household appliances, consumer electrical products and branch circuits when the occurrence of a ground fault is detected. Many of these various loads or electrical wiring devices include a line side, which is connectable to a source of electrical power. In addition, these devices have a load side, which is connectable to one or more loads. At least one conductive path exists between the line and load sides. Specifically, when abnormal current flows through a line to ground, the GFCI immediately interrupts the fault to halt this abnormal flow.

GFCI devices, such as the device described in commonly owned U.S. Pat. No. 4,595,894, incorporated herein by reference, use a trip mechanism to break an electrical connection between the line side and the load side. Such devices are resettable after they are tripped by, for example, the detection of a ground fault. Specifically, in the '894 patent, the trip mechanism used to cause the breaking of the circuit (i.e., the conductive path between the line and load sides) includes a solenoid (or trip coil). Once an imbalance in current flow is detected between the power lines, the GFCI produces an output signal. The output signal energizes a trip coil within the trip mechanism which disconnects the source of electrical power from a load.

The conventional GFCI further includes a triode alternating current switch (TRIAC) which controls the amount of current flow when properly activated. Instances, however, may arise where the TRIAC becomes shorted which causes the trip coil to be continuously energized. As a result, when the trip coil is continuously energized, it may become permanently damaged after a short period of time. Thereby, the trip mechanism will be disabled.

Accordingly, a user may find a GFCI in a tripped state and not be aware that the internal trip mechanism is not functioning properly. The user may then press the reset button, which will cause the device with an inoperative trip mechanism to be reset. Thus, a dangerous condition will exist wherein the GFCI will then provide power to a load without ground fault protection.

Accordingly, there is a need for providing an indication of such a GFCI failure condition.

The present invention is directed to overcoming, or at least reducing the effects of one or more of the problems set forth above.

SUMMARY OF THE INVENTION

To address the above-discussed deficiencies of circuit interrupters, the present invention teaches a ground fault circuit interrupter (GFCI) having a fault indicator device or signaling device that provides a continuous audible/visual indication of a failure condition of the GFCI. A failure condition may occur when continuous current flows through the terminals of a trip coil caused by a failed or damaged component such as a TRIAC or silicon control rectifier (SCR) within the control circuit of the circuit interrupter. The failure indicator is connected across the trip coil thereby allowing an indicator circuit to detect the current flow. By placing such a visual and/or audible signaling device as the indicator circuit across the trip coil terminals, the shorted TRIAC or SCR provides continuous power to the coil terminals and the signaling device, even after the coil has burned out, thereby reminding a user to replace the GFCI receptacle. The signaling device can be implemented as an LED, neon lamp, buzzer or other device. The signaling device also can be activated momentarily in normal operating situations whenever the trip coil of the GFCI detects a ground fault condition or when a reset button is pressed.

Specifically, the circuit interrupter device in accordance with the present invention includes a transformer arrangement adapted to generate a control signal in response to the imbalance of current flow between a first and a second load terminal. A control circuit connects to the transformer arrangement to selectively generate a switching signal in response to the control signal. The control circuit connects to a trip coil for triggering a circuit interrupt in response to the switching signal. An indicator circuit connects across the terminals of the trip coil for detecting a continuous failure current flow to the trip coil to provide an indication of a failed component within the control circuit Although the techniques of the present invention have been explained in the context of a GFCI, it is noted that the techniques are equally applicable to other circuit interrupter devices such as an arc fault circuit interrupter (AFCI), immersion detection circuit interrupter (IDCI), appliance leakage circuit interrupter (ALCI), and equipment leakage circuit interrupter (ELCI).

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawing in which like reference numbers indicate like features and wherein.

DETAILED DESCRIPTION

Figure 1:
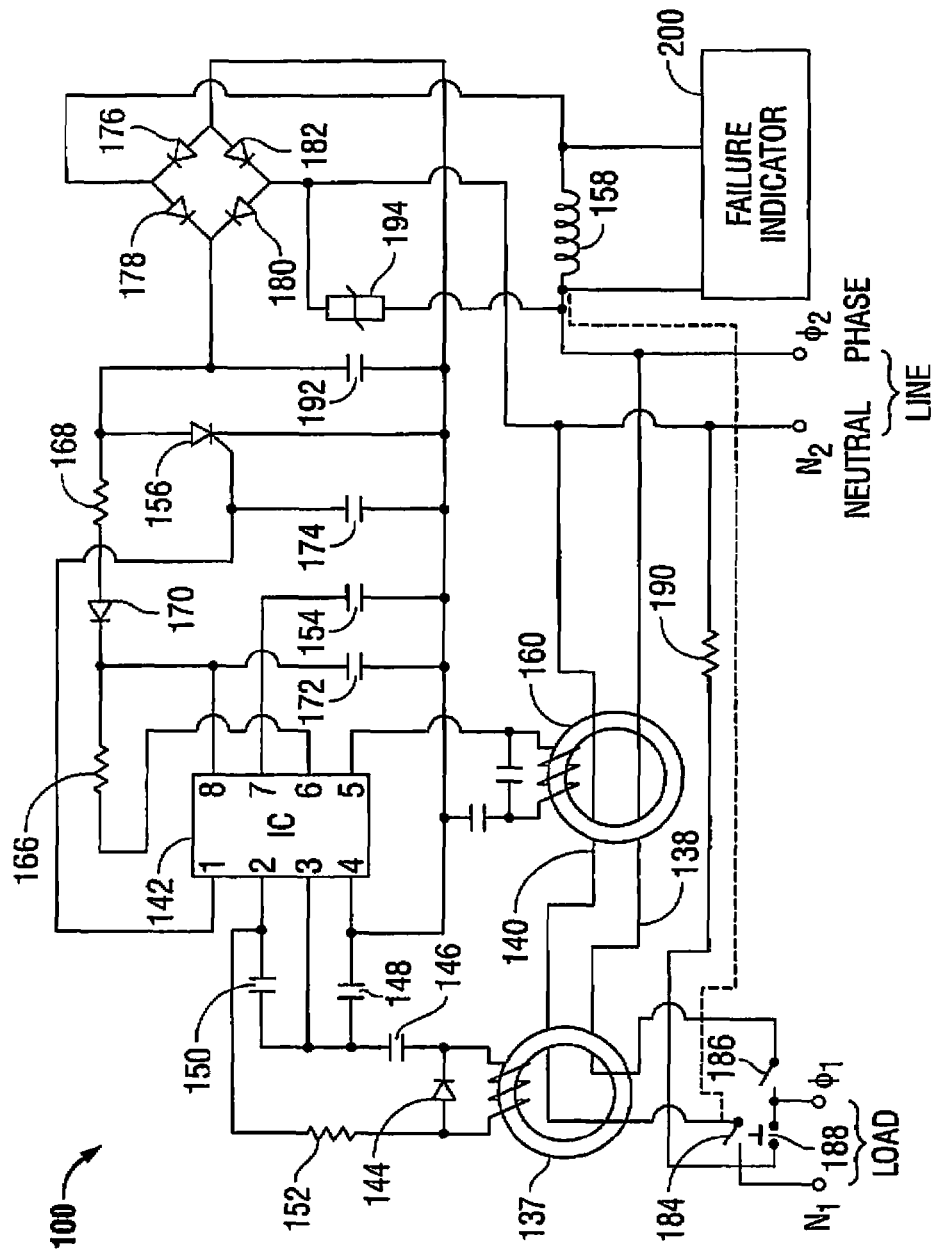
FIG. 1 is a schematic diagram of a GFCI having a GFCI failure indicator according to an embodiment of the invention.

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The present invention discloses a GFCI fault indicator device that provides a continuous audible/visual indication upon the detection of a failure condition. A failure condition may occur when continuous current flows to the terminals of a trip coil caused by a failed or damaged component such as a TRIAC or SCR of a GFCI. The failure indicator is coupled across the trip coil thereby allowing the indicator to detect the current flow. The failure indicator device also can be activated momentarily in normal operating situations whenever the trip coil of the GFCI detects a ground fault condition.

FIG. 1 shows a schematic diagram of a sensing circuit 100 having a failure indicator 200 according to an embodiment of the present invention. The failure indicator 200 is coupled across the terminals of a trip coil 158 to provide an indication of a GFCI failure condition. An example of a failure condition occurs when the silicon controlled rectifier (SCR) 156 or another switch is shorted, causing SCR 156 to continuously conduct current and, as a result, current flows through the terminals of trip coil 158. Failure indicator 200 can be any audible and/or visual signaling device such as a LED, a neon lamp, buzzer or other signaling device. Failure indicator device 200 can be activated momentarily in normal operating situations whenever trip coil 158 of sensing circuit 100 receives a signal to trip such as by pressing a test button 188 or when a ground fault is detected.

In addition to having failure indicator 200, during normal operation, sensing circuit 100 is capable of detecting two types of ground faults: (1) a line imbalance fault condition and (2) a neutral to ground fault condition. During a line imbalance fault condition, differential transformer 137 monitors the flow of current in the line and neutral conductors and produces in its secondary a fault signal when the total current in the line conductor or conductors 138 does not equal the current in the neutral conductor 140. The output from the secondary of differential transformer 137 is fed to integrated circuit 142 through diode 144, capacitors 146, 148 and 150, and resistor 152. Resistors 166 and 168 along with diode 170 and capacitor 192 provide current limitation and filtering of the rectified AC signal present at the junction of diodes 178 and 180. Integrated circuit 142 may be a type NL 1851 Ground Fault Interrupter manufactured by National Semiconductor Corporation. Upon a neutral to ground fault condition, the system functions somewhat similarly in that transformer 160, together with differential transformer 137, has a signal induced on the secondary windings which is fed to integrated circuit 142.

The trip circuit for both types of faults is identical in that, if a fault is detected by the input pins 2, 3, and 4 of IC 142, a signal is output from pin 7 of integrated circuit 142 causing capacitor 154 to charge. Based on the amplitude and length of time of the fault signal received by integrated circuit 142, a signal is outputted on pin 1 which is received by the gate of SCR 156. Thus, SCR 156 is turned ON. SCR 156 then conducts and an energization path to trip coil 158 is created through the diode bridge containing diodes 176, 178, 180 and 182. Upon energization of trip coil 158 due to a line to ground fault, contacts 186 and 184 of the ground fault circuit interrupter are opened which respectively open lines 138 and 140. Push-button 188 and resistor 190 are part of a test circuit which bypasses the transformers 137 and 160. Capacitor 192 and Metal Oxide Varistor (MOV) 194 are present for surge protection. Trip coil 158 along with switches 184 and 186 typically form a relay which disconnects the load terminals ($N_1$, $\Phi_1$) from the line terminals ($N_2$, $\Phi_2$) when a fault is detected.

Although the above discussion focused on a GFCI, it is noted that the techniques of the present invention are equally applicable to other circuit interrupter devices that work on the same or similar principle such an AFCI, an LCDI, an ALCI or ELCI.

Those of skill in the art will recognize that the physical location of the elements illustrated in FIG. 1 can be moved or relocated while retaining the function described above. For example, the location of the failure indicator 200 may be moved to monitor any of the energized paths discussed above.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A circuit interrupting device with a failure indicator, the circuit interrupting device comprising:
   a circuit interrupter which includes a solenoid having a first terminal and a second terminal;
   a sensing circuit operable with a transformer arrangement adapted to generate a signal in response to one or more predetermined conditions in phase and neutral conductors connected to the device; and
   the failure indicator is electrically connected in parallel with the solenoid and a current limiting resistor, said failure indicator directly connected to said first and second terminals of said solenoid such that the solenoid electrically shorts the failure indicator when the solenoid is not damaged as an open circuit;
   wherein the failure indicator provides a direct output indication to a user when the device is unable to respond to the one or more predetermined conditions.

2. The circuit interrupting device of claim 1 where the direct output indication of the failure indicator is an audible or visual device.

3. The circuit interrupting device of claim 1 where the failure indicator is configured to detect a continuous failure current flow to the solenoid.

4. The circuit interrupting device of claim 1 where the solenoid is a trip coil of a relay.

5. The circuit interrupting device of claim 1 where the failure indicator is a Light Emitting Diode (LED).

6. The circuit interrupting device of claim 1 where the failure indicator is a neon lamp.

7. The circuit interrupting device of claim 1 where the failure indicator is a buzzer.

8. The circuit interrupting device of claim 1 where the device is a Ground Fault Circuit Interrupter (GFCI).

9. The circuit interrupting device of claim 1 where the device is an Arc Fault Circuit Interrupter (AFCI).

10. The circuit interrupting device of claim 1 where the device is an Immersion Detection Circuit Interrupter (IDCI).

11. The circuit interrupting device of claim 1 where the device is an Appliance Leakage Circuit Interrupter (ALCI).

12. The circuit interrupting device of claim 1 where the device is a Equipment Leakage Circuit Interrupter (ELCI).

13. A circuit interrupting device comprising:
   a circuit for receiving a fault signal and outputting a signal to a solenoid via a diode bridge circuit arrangement;

a fault indicator electrically connected in parallel with said solenoid and a current limiting resistor, said solenoid electrically connected to said diode bridge circuit arrangement; and a transformer arrangement adapted to generate a signal in response to one or more predetermined conditions in phase and neutral conductors connected to the device;

wherein the failure indicator provides a direct output indication to a user when the device is unable to respond to the one or more predetermined conditions.

14. The circuit interrupting device of claim 13 where the circuit interrupting device is selected from the group consisting of a GFCI, an AFCI, an IDCI, an ALCI, or an ELCI.

15. The circuit interrupting device of claim 13 where said solenoid is a trip coil of a relay, said trip coil connected to a phase line.

16. The circuit interrupting device of claim 13 wherein the transformer configuration is electrically connected to said circuit via a circuit arrangement having a diode, at least one capacitor and a resistor.

17. The circuit interrupting device of claim 13 where the device further comprises a test circuit, said test circuit including a first wire connected to said solenoid and a second wire connected to said diode bridge circuit arrangement.

18. A circuit interrupting device comprising:

a transformer arrangement adapted to generate a signal in response to one or more predetermined conditions in phase and neutral conductors connected to the devise;

a control circuit configured to selectively generate a switching signal in response to the fault signal and to trigger a circuit interrupt; and a failure indicator electrically connected to the control circuit;

wherein the failure indicator provides a direct output indication to a user when the device is unable to respond to the one or more predetermined conditions.

19. The device of claim 18 further comprising a circuit in electrical communication with said control circuit, said circuit comprising at least one capacitor and a Metal Oxide Varistor (MOV) configured for surge protection.

20. The device of claim 19 where the circuit further comprises a trip coil of a relay, said trip coil electrically connected in parallel with said failure indicator.

21. The device of claim 18 where the transformer arrangement is electrically connected to said control circuit via a circuit arrangement having a diode, at least one capacitor, and a resistor.

* * * * *